United States Patent [19]

Temel

[11] 4,011,836

[45] * Mar. 15, 1977

[54] PET COMMODE

[76] Inventor: Franklin Temel, 1050 NE. 91st Terrace, Miami Shores, Fla. 33138

[ * ] Notice: The portion of the term of this patent subsequent to Oct. 22, 1991, has been disclaimed.

[22] Filed: Sept. 22, 1975

[21] Appl. No.: 615,493

[52] U.S. Cl. .................................. 119/1
[51] Int. Cl.² ...................................... A01K 29/00
[58] Field of Search ............ 119/1; 4/100; 317/256

[56] References Cited

UNITED STATES PATENTS

| | | | |
|---|---|---|---|
| 3,310,031 | 3/1967 | Lowe, Jr. | 119/1 |
| 3,593,073 | 7/1971 | Atkins | 317/256 |
| 3,835,812 | 9/1974 | Edwards | 119/1 |
| 3,842,803 | 10/1974 | Temel | 119/1 |

*Primary Examiner*—J.N. Eskovitz
*Attorney, Agent, or Firm*—Spencer & Kaye

[57] ABSTRACT

A pet commode composed of a housing having upstanding side walls and a recessed bottom to which a drain passage is connected, a floor disposed in the housing for supporting a pet and for receiving its bodily waste products, the floor being mounted to pivot about a substantially horizontal axis to permit waste products deposited on the floor to fall to the housing bottom, at least one water spray pipe located in the housing below the floor and arranged to direct water sprays upwardly against the floor while it is undergoing pivoting motion subsequent to the deposit of waste products thereon, and control devices for automatically pivoting the floor and initiating the water spray after a pet has left the commode.

8 Claims, 4 Drawing Figures

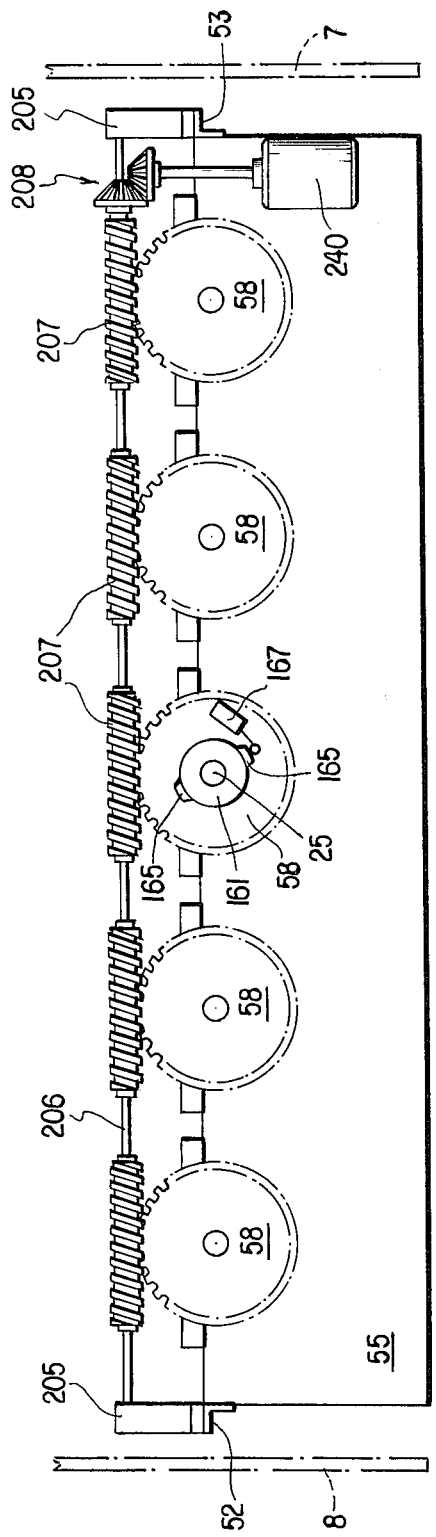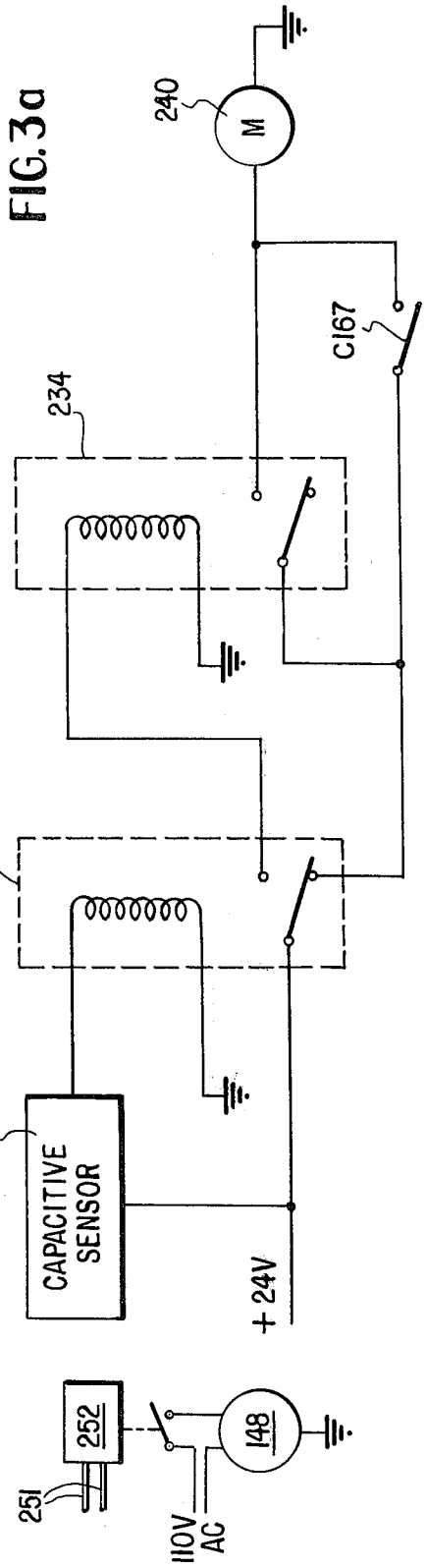

PET COMMODE

BACKGROUND OF THE INVENTION

The present invention relates to pet commodes, particularly of the type which is connectable to a sewage drain and which operates automatically.

One of the complicating factors of modern high density urban life is the difficulty which it creates for pet owners, particularly as concerns their pets' daily need to eliminate bodily wastes.

This problem is particularly acute in the case of dogs.

In particular in the case of seeing eye dogs great difficulties are encountered in providing for elimination by the animal. Quite often the blind owner must either permit the animal to relieve himself indoors or must incur the risks of walking the animal outdoors.

Even when a dog owner can walk his pet outdoors several times a day, no fully satisfactory location can be found for the elimination of fecal wastes. Elimination on the sidewalk, in the street curb, or on lawns raises obvious objections as does elimination in vacant lots, where children often play.

This problem is becoming increasingly difficult for dog owners as urban density increases and as more and more communities pass ordinances limiting the places where pets can defecate.

When the pet cannot be taken outside daily, for various reasons, the problem becomes even more acute. Litter boxes, newspaper, or other receptacles must then be provided for the elimination of waste products and require a periodic cleaning out, which is odious and time consuming and which inhibits the owner from leaving his home for long periods of time. In addition, such receptacles are a source of unpleasant odors and can therefore be satisfactorily placed only in a few locations around a house or apartment.

Among previous proposals addressed to this problem are various pet toilets, some of which are to be attached atop a toilet bowl intended for human use. These devices have various drawbacks. In particular, those which are to be attached atop a toilet bowl can be reached by the pet only with difficulty and require that the pet accurately position itself in order for the waste products to fall into the underlying toilet bowl. In addition, such a device, particularly if it provides for automatic toilet flushing, can be removed from the toilet only with difficulty. Therefore, a toilet equipped with such a device is, for all intents and purposes, made unavailable to human users.

Other units which have been previously proposed, whether they are to be cleaned automatically or under manual control, can often not be completely cleaned and thus leave waste residues which are unsightly and odorous.

Many of these difficulties are eliminated by the novel pet commode which is the subject of my U.S. Pat. No. 3,842,803, issued Oct. 27, 1974 and titled PET COMMODE. The commode disclosed therein includes a housing having opposed front and rear walls, opposed side walls extending to a height greater than that of the front and rear walls, and a bottom recessed below the upper extremities of the side walls and provided with an outlet passage. The commode further includes a floor located in the housing for supporting a pet and receiving its bodily waste products, the floor being below the upper extremities of the front and rear walls and being mounted for pivotal movement about a substantially horizontal axis for permitting waste products deposited thereon to fall onto the housing bottom. A water spray device is also provided and is located in the housing below the floor for directing water sprays against the floor, the floor surface receiving waste products being struck by such sprays when the floor undergoes its pivotal movement. The spray device is associated with a controllable water delivery arrangement and the floor is associated with a controllable drive unit for imparting the desired pivotal movement thereto. A control unit is connected to the water delivery device and the drive unit and is responsive to the departure of a pet from the floor to cause the water delivery element to deliver water under pressure to the spray device and to cause the drive unit to impart the desired pivotal movement to the floor.

The floor is preferably constituted by a plurality of parallel slats each arranged to pivot about a longitudinally extending axis. The floor is preferably arranged to pivot through an angle of 180° or less under control of the drive unit and to pivot back to its original position at the end of a predetermined period of time.

The spray device of this commode may be constituted by one or several spray pipes which extend parallel to the floor slats and which are each located directly below the narrow space separating two adjacent slats. Each spray pipe is provided with spray outlets disposed for causing water to be sprayed generally upwardly, but at an angle to the vertical to prevent water from spraying upwardly through the space between adjacent slats and thus striking surfaces outside of the housing.

The spray device further includes a spray pipe extending along the upper edge of each side wall and having a plurality of nozzles or outlet tubes extending through openings provided in the associated side wall. Some of these tubes supply a flushing stream to the side wall to wash away urine. The remaining tubes direct water streams onto the floor.

SUMMARY OF THE INVENTION

It is a primary object of the present invention to improve the operation of pet commodes of the type disclosed in my above-cited patent.

Another object of the invention is to simplify the structure of such commode, thereby reducing its cost of manufacture and improving its dependability.

These objects are achieved by providing the pet commode with an improved drive unit for imparting the desired pivotal movement to the floor, the drive unit being composed essentially of a shaft carrying a plurality of worm gears each operatively engaging a gear connected to a respective pivotal floor member, and by driving the worm gear via an electric motor.

The objects according to the invention are further achieved by forming the side walls of the commode to be curved inwardly so as to improve the retention of urine within the unit and to reduce the possibility of the escape of water sprays.

The objects according to the invention are additionally achieved by the provision of a simplified control circuit and by the utilization of capacitive sensors to sense the presence of an animal in the vicinity of the commode and to control the operation of the control circuit.

BRIEF DESCRIPTION OF THE DRAWINGS

FIG. 2 is a front elevational view, similar to that of FIG. 4 of my above-cited patent, illustrating one preferred embodiment of the novel drive unit according to the present invention.

FIG. 3a is a circuit diagram of the improved control circuit according to the present invention.

FIG. 3b is a circuit diagram of a water level control circuit employed in embodiments of the invention.

DESCRIPTION OF THE PREFERRED EMBODIMENTS

Figure 1:
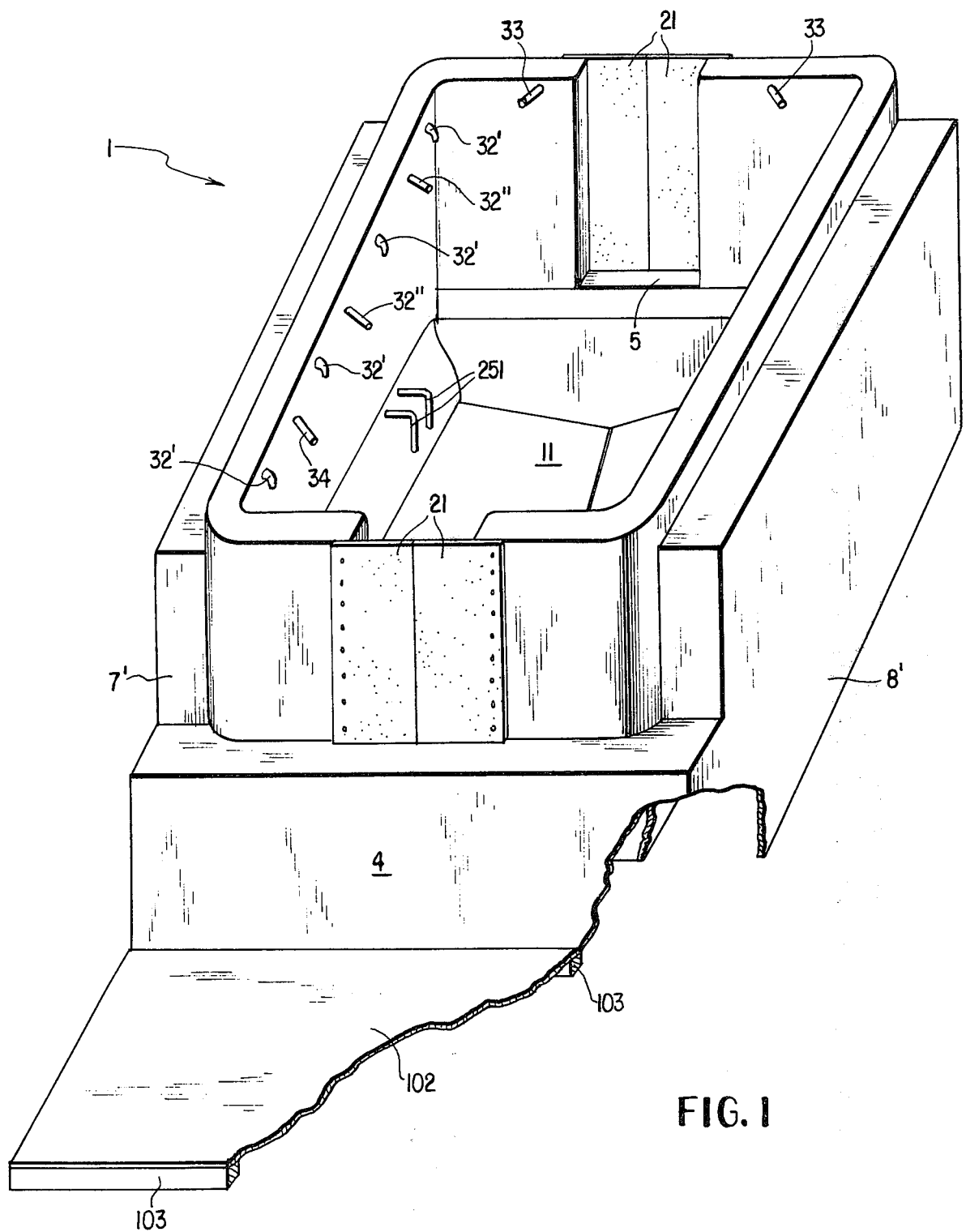
FIG. 1 is a perspective view of one preferred embodiment of a pet commode housing according to the present invention, illustrating one of the capacitive sensors and the configuration of the side walls according to one preferred embodiment of the present invention.

FIG. 1 is a perspective view, similar to that of FIG. 1 of my above-cited patent showing a commode housing which is modified in accordance with several features of the present invention.

To better confine urine and the washing sprays within the housing, the inner surfaces of side walls 7' and 8' of housing 1 may be inwardly curved in the vicinity of their upper portions and the spray nozzles 32' and 32" are suitably located to effectively wash the walls and spray the pivotal floor, the latter not appearing in FIG. 1.

The walls 7' and 8' are formed to also enclose portions of the front and rear ends of the housing, the inner surfaces being rounded at the corners of the housing to facilitate cleaning. For example, the inner surfaces may have the form of quarter-cylinders at the corners.

At the front and rear ends of the housing, the walls are spaced apart to present passages via which an animal may enter and leave the commode. These passages are closed by flexible flaps 21 of rubber or similar material, each flap 21 being attached to a respective wall end by bonding, riveting or the like.

Alternatively, flaps 21 can be of more rigid composition and can be attached to the wall ends by hinges.

Flaps 21 are mounted so that they are normally closed to effectively prevent passage of urine or wash water out of the housing. The flaps are made sufficiently yieldable to permit an animal to push them aside to enter or leave the housing enclosure, while being sufficiently resistant to movement to remain closed if subject to the weight of a male animal's hind leg if such animal should push his leg against a flap while eliminating.

The housing is provided with four additional spray nozzles 33 for washing the rounded corners of the inner wall surfaces and with two or four additional nozzles for washing the inner surfaces of flaps 21.

The embodiment shown in FIG. 1 also includes two conductive plates 102, each disposed at a respective end of the housing so that only one thereof is visible, and each mounted on a suitable electrically insulating frame 103.

Plates 102 constitute the capacitive pick-ups, or antennae, of a capacitive-controlled actuation circuit. The circuit to which plates 102 are connected could be of any known type, such as those disclosed in U.S. Pat. Nos. 3,199,033 and 3,593,073, the circuit being adjusted to produce an output signal when a household pet is on, or within a selected distance of, one of the plates 102, this distance being at least great enough to assure maintenance of an output signal when the pet is present within the housing.

The control circuit could also be provided with a pair of microswitches, each located beneath the center of a respective one of plates 102 and connected into the circuit to permit an output signal to be produced only after one of the microswitches has been actuated. This could, among other things, assure that operation of the flushing system would be triggered only if the pet had previously walked upon one of the plates, indicating the pet was entering the unit, whereas operation of the system would not be triggered if the pet, or a person, simply came close enough to the unit to produce a capacitance-responsive input signal.

The housing is further provided with a pair of conductive probes 251 connected to a circuit for sensing the presence of liquid above a certain level in the housing. Circuits of this type are well-known in the art. This circuit is, according to the invention, connected to operate macerator 2' of my U.S. Pat. No. 3,842,803 as long as the water level in housing 1 is above the level to which the probes 251 are to respond. This not only permits more reliable operation of the macerator, but also assures that a certain quantity of water will remain in the bottom of the housing. This residual water will help to reduce odor problems. It will also assure more complete flushing of waste material by eliminating the tendency of solid waste to adhere to housing bottom 11 and by immediately diluting the solid waste. Macerator 2' of U.S. Pat. No. 3,842,803 closes the fluid outlet when it is off.

In view of the sensors employed to initiate operation of the flushing system and of the macerator, the housing of FIG. 1 need not be supported by the movable system illustrated in FIGS. 2 and 3 of my U.S. Pat. No. 3,842,803. Thus, the frame which in that patent is composed of members 33 can be eliminated, as well as frame members 57 and elements 34–49, and the housing can rest directly on the floor.

FIG. 2 illustrates the novel drive arrangement according to the invention, which differs from that of FIG. 4 of my U.S. Pat. No. 3,842,803 in that it is composed of a shaft 206 rotatably supported between bearings 205 supported on frame members 52 and 53, a plurality of worm gears 207 rigid with shaft 206 and each operatively engaging a respective gear, or toothed wheel, 58, and a drive motor 240 drivingly connected to shaft 206 via a set of meshing bevel gears 208, one bevel gear being connected for rotation with the shaft of motor 240 and the other bevel gear being connected for rotation with shaft 206.

In addition, the shaft 25 of the central floor slat has keyed thereto a cam disc 161 carrying two diametrically opposed projections, or camming surfaces, 165. A microswitch 167 containing a movable contact is stationarily mounted on plate 55 (mounting not shown). Microswitch 167 is arranged to normally close the circuit between its external contacts and is positioned so that its normally closed contact is opened each time the roller supported at the end of its movable contact actuator engages one of projections 165.

As will be explained more fully in connection with FIG. 3a, the movable contact of microswitch 167 is connected in the power supply circuit of motor 240 so that after the motor begins operation, it will be stopped by the next engagement of a projection 165 with the actuator of microswitch 167. Thus, during each operation motor 240 will rotate the floor slats through an angle of 180°. If it is desired to rotate the slats by 360° during each operation, it is only necessary to eliminate one of the projections 165 from disc 161.

The arrangement shown in FIG. 2 may or may not be provided with the interlock system shown in FIG. 4 of my U.S. Pat. No. 3,842,803. In many cases the mechanical advantage due to the effective gear ratio between gears 207 and 58 will provide sufficient mechanical resistance to hold the floor slats in position when an animal is standing thereon. Moreover, in view of this gear ratio, use can be made of a low torque drive motor.

The connection between motor 240 and gear set 208 can be via a slip clutch in order to further protect an animal from injury if its foot should be caught between slats while they are rotating and if the control system should fail to respond to the presence of the animal on the unit.

FIG. 3, illustrates one embodiment of a simplified control circuit according to the invention. This circuit includes a capacitive sensor 260 whose input is constituted by the plates 102 shown in FIG. 1. Sensor 260 may be of a type discussed above as is adjusted to produce an output signal when an animal of the size of a dog or cat is within a selected distance from the commode.

Such an output signal, which can, if necessary, be amplified by a transistor output stage, is applied to the coil of a relay 261 to actuate the relay whenever an animal is within such selected distance from the commode.

When relay 261 is actuated, voltage is applied via its closed contact to the coil of a time-delay turn-off relay 234 to actuate that relay, thus connecting its movable contact to the power input of motor 240 and to three coils (not shown) corresponding, respectively, to coils S101, S103 and S96 of FIGS. 5 and 6 of U.S. Pat. No. 3,842,803 and connected to control the operation of respectively, valve 101 supplying water to pipes 31, optional pump 103 for pumping water to the various spray pipes, and valve 96 controlling the delivery of water to pipes 31 and 32, essentially as shown in FIG. 6 of U.S. Pat. No. 3,842,803.

However, as long as relay 261 remains energized, no connection exists between the electrical devices connected to the normally open contact of relay 234 and the system voltage source.

Also included in the circuit is the movable contact C167 of normally closed microswitch 167. Before operation of the system begins, contact C167 is held open as a result of its engagement with one projection 165 on disc 161.

Then, when a pet leaves the proximity of the unit, relay 261 is deactuated so that operating voltage is supplied to the movable contact of relay 234 and to movable contact C167. Although deenergization of relay 261 has the effect of disconnecting the coil of relay 234 from the system voltage source, this coil remains energized for a preset period of time due to the fact that relay 234 is of the time-delay turn-off type. The preset time period is made sufficiently long, for example 2 seconds, to permit motor 240 to commence operation and to rotate gears 58 by an amount sufficient to carry projection 165 out of engagement with microswitch 167 and thus permit contact C167 to close. Thereafter operating power continues to be supplied to motor 240 and to the various control coils through contact C167.

These members continue operating until the next projection 165 engages microswitch 167, whereupon contact C167 opens, motor 240 stops and delivery of water to the spray pipes ceases. The system is then ready for a new operating cycle.

If, during a flushing operation, sensor 260 should sense the presence of a pet near the unit, relay 261 will be energized so as to disconnect the voltage source from motor 240 and the windings controlling water delivery. Therefore, the floor slats will not rotate and water sprays will not be produced as long as there is a danger of the pet reentering the unit. When the pet again moves away from the unit, it simply will complete its current operating cycle.

The circuit shown in FIG. 3b includes a contact circuit connected to probes 251 and arranged to supply operating power to macerator motor 148 as long as the level of water in the unit is above that to be sensed by probes 251. Circuits capable of thus responding to a preselected water level are well-known in the art and any suitable circuit of this type can be employed.

As alternatives to the arrangement described above for initiating a washing, or flushing, cycle, it would be possible to sense the opening of any one flap 21 or to provide a light barrier across each entrance to the housing.

It will be understood that the above description of the present invention is susceptible to various modifications, changes and adaptations, and the same are intended to be comprehended within the meaning and range of equivalents of the appended claims.

I claim:
1. In a pet commode including: a housing having a bottom provided with an outlet passage; means located in said housing and defining a floor for supporting a pet and receiving its bodily waste products, said floor being mounted for pivotal movement about a substantially horizontal axis for permitting waste products deposited on said floor to fall onto said housing bottom surface; water spray means located in said housing for directing water sprays against said floor, whereby the surface of said floor which receives waste products is struck by such sprays when said floor undergoes such pivotal movement; controllable water delivery means connected to said spray means for delivering water thereto; controllable drive means connected to said floor for imparting such pivotal movement thereto; and control means connected to said water delivery means for causing said delivery means to deliver water under pressure to said spray means, the improvement wherein said controllable drive means comprise an electric motor having its shaft connected to said floor and having its electrical power inputs connected to have the delivery of operating power thereto controlled by said control means.

2. An arrangement as defined in claim 1 wherein said means defining a floor comprise a plurality of slats disposed side by side, and a plurality of pivotal supports each associated with a respective slat for pivoting its associated slat about a substantially horizontal axis, the pivot axes of all of said slats being substantially parallel to one another, and said drive means further comprise a gear wheel connected to each pivotal support, and a plurality of worm gears each connected in driving relation to a respective gear wheel and connected to be driven by said electric motor.

3. An arrangement as defined in claim 2 wherein said drive means further comprise a shaft on which all of said worm gears are coaxially disposed for rotation as a unit, and coupling means connecting said shaft to said motor.

4. An arrangement as defined in claim 1 wherein said control means comprise: a capacitance responsive circuit for producing an output signal in response to, and during, the presence of a pet in the vicinity of said commode; and a control circuit connected to said capacitance responsive circuit and connected to said water delivery means and said drive means for initiating operation of said water delivery means and said drive means after production and subsequent termination of such an output signal.

5. An arrangement as defined in claim 4 wherein said control means further comprise a position responsive switch operatively arranged to respond to the position of said floor connected for terminating operation of said drive means after such operation has commenced and said floor has subsequently reached a selected position for supporting a pet.

6. An arrangement as defined in claim 5 wherein said control means further comprise a cam member mounted for pivotal movement together with said floor and said switch is disposed to be activated by said cam member.

7. An arrangement as defined in claim 1 further comprising means for selectively closing said outlet passage and water level sensing means located in said housing for opening said outlet passage only when the water in said housing bottom is above a predetermined level.

8. An arrangement as defined in claim 1 wherein said housing has opposed side walls extending above said floor and formed to curve inwardly toward one another in the region above said floor.

* * * * *